United States Patent
Flynn et al.

(10) Patent No.: US 8,933,993 B1
(45) Date of Patent: Jan. 13, 2015

(54) HYBRID LOCAL AND CLOUD BASED METHOD FOR POSE DETERMINATION OF A MOBILE DEVICE

(75) Inventors: John Flynn, Marina del Rey, CA (US); Rafael Spring, Langquaid (DE); Dragomir Anguelov, Mountain View, CA (US); David Petrou, Brooklyn, NY (US)

(73) Assignee: Google Inc., Mountain View, CA (US)

( * ) Notice: Subject to any disclaimer, the term of this patent is extended or adjusted under 35 U.S.C. 154(b) by 481 days.

(21) Appl. No.: 13/350,906

(22) Filed: Jan. 16, 2012

(51) Int. Cl.
*H04N 13/02* (2006.01)
*G06T 7/00* (2006.01)

(52) U.S. Cl.
CPC .................................... *G06T 7/004* (2013.01)
USPC ........................................................... 348/46

(58) Field of Classification Search
CPC .............................. G06T 7/004; G06T 11/60
See application file for complete search history.

(56) References Cited

U.S. PATENT DOCUMENTS

| | | | |
|---|---|---|---|
| 2010/0191459 A1 | 7/2010 | Carter et al. | |
| 2011/0172918 A1* | 7/2011 | Tome | 701/220 |
| 2011/0275408 A1* | 11/2011 | Kulik | 455/556.1 |

FOREIGN PATENT DOCUMENTS

WO 2010045271 4/2010

OTHER PUBLICATIONS

Schall et al., "3D Tracking in Unknown Environments Using On-Line Keypoint Learning for Mobile Augmented Reality," IEEE computer Society Conference on Computer Vision and Pattern Recognition (Jun. 2008).
Takacs et al., "Outdoors Augmented Reality on Mobile Phone Using Loxel-Based Visual Feature Organization," ACM International Conference on Multimedia Information Retrieval (Oct. 2008).
Nixon et al., "SmartReality: Augmented Reality + Services + Semantics," SmartReality Consortium, International AR Standards Meeting (Feb. 2011).

* cited by examiner

*Primary Examiner* — Huy T Nguyen
(74) *Attorney, Agent, or Firm* — Fish & Richardson P.C.

(57) ABSTRACT

The present application discloses systems and methods for estimating a global pose of a device. In some implementations, a method is disclosed that includes causing a detector on a device to record an image of a view from the device, sending to a server a query based on the image, and receiving from the server an estimated global pose of the device. The method further includes determining an updated estimated global pose of the device by causing the detector to record an updated image of an updated view from the device, causing at least one sensor on the device to determine at least one sensor reading corresponding to movement of the device, determining a relative pose of the device based on the updated image and the at least one sensor reading, and, based on the relative pose and the estimated global pose, determining the updated estimated global pose.

19 Claims, 8 Drawing Sheets

US 8,933,993 B1

HYBRID LOCAL AND CLOUD BASED METHOD FOR POSE DETERMINATION OF A MOBILE DEVICE

BACKGROUND

Augmented reality generally refers to a real-time view of a real-world environment that is augmented with additional content. Typically, a user experiences augmented reality through the use of a computing device.

The computing device is typically configured to generate the real-time view of the environment, either by allowing a user to directly view the environment or by allowing the user to indirectly view the environment by generating and displaying a real-time representation of the environment to be viewed by the user. Further, the computing device is typically configured to generate the additional content. The additional content may include, for example, one or more additional content objects that overlay the real-time representation of the environment.

SUMMARY

In order to optimize the augmented reality experience of the user of the computing device, it is beneficial for the computing device to align the additional content with the underlying real-time representation of the environment. To this end, the computing device is typically further configured to determine a so-called global pose of the computing device. The global pose typically includes an estimated location and orientation of the computing device.

Techniques for determining an estimated global pose of a computing device may be generally categorized as server-side techniques and device-side techniques.

In server-side techniques, a server in communication with the computing device via, for example, a wireless connection may periodically determine an estimated location and orientation of the computing device using one or more types of information supplied by the computing device and may provide to the computing device an estimated global pose based on the estimated location and orientation. However, on account of one or more limitations of the server, the computing device, and/or the wireless connection between the server and the computing device, typical server-side techniques may not provide the estimated global pose of the computing device with sufficient frequency to be used with augmented reality.

In device-side techniques, the computing device may use one or more location sensors, such as, for example, a global positioning system (GPS) receiver, to periodically determine an estimated location of the computing device. Further, the computing device may use one or more orientation sensors such as, for example, a gyroscope and/or a compass, to periodically determine an estimated orientation of the computing device. Still further, the computing device may determine an estimated global pose based on the estimated location and orientation. However, because of error in one or both of the location sensor and the orientation sensor, typical device-side techniques may be unable to determine the estimated global pose of the computing device with sufficient accuracy to be used with augmented reality.

The present application discloses devices and methods for determining an estimated global pose of a device for use with augmented reality applications. The disclosed devices and methods are not limited to augmented reality, however, and could be used with other applications as well.

In some implementations, a method is disclosed. The method includes causing a detector on a device to record an image of a view from the device and sending to a server a query based on the image. The method further includes, in response to sending the query, receiving from the server an estimated global pose of the device that includes an estimated location of the device and an estimated orientation of the device. The method further includes determining an updated estimated global pose of the device. According to the method, determining the updated estimated global pose involves causing the detector to record an updated image of an updated view from the device, causing at least one sensor on the device to determine at least one sensor reading corresponding to movement of the device, determining a relative pose of the device based on the updated image and the at least one sensor reading and, based on the relative pose and the estimated global pose, determining the updated estimated global pose. The relative pose is relative to the estimated global pose.

In other implementations, a non-transitory computer readable medium is disclosed having stored therein instructions executable by a computing device to cause the computing device to perform the method described above.

In still other implementations, a device is disclosed. The device includes a detector configured to record an image of a view from the device and record an updated image of an updated view from the device, and an output interface configured to send to a server a query based on the image. The device further includes an input interface configured to receive from the server, in response to sending the query, an estimated global pose of the device, where the estimated global pose of the device includes an estimated location of the device and an estimated orientation of the device. The device further includes at least one sensor configured to determine at least one sensor reading corresponding to movement of the device, at least one processor, and data storage comprising updating logic. The updating logic is executable by the at least one processor to determine an updated estimated global pose of the device, where determining the updated estimated global pose includes determining a relative pose of the device based on the updated image and the at least one sensor reading and, based on the relative pose and the estimated global pose, determining the updated estimated global pose. The relative pose is relative to the estimated global pose.

Other implementations are described below. The foregoing summary is illustrative only and is not intended to be in any way limiting. In addition to the illustrative aspects, implementations, and features described above, further aspects, implementations, and features will become apparent by reference to the figures and the following detailed description.

DETAILED DESCRIPTION

The following detailed description describes various features and functions of the disclosed systems and methods with reference to the accompanying figures. In the figures, similar symbols typically identify similar components, unless context dictates otherwise. The illustrative system and method implementations described herein are not meant to be limiting. It will be readily understood that certain aspects of the disclosed systems and methods can be arranged and combined in a wide variety of different configurations, all of which are contemplated herein.

1. Example System

Figure 1:
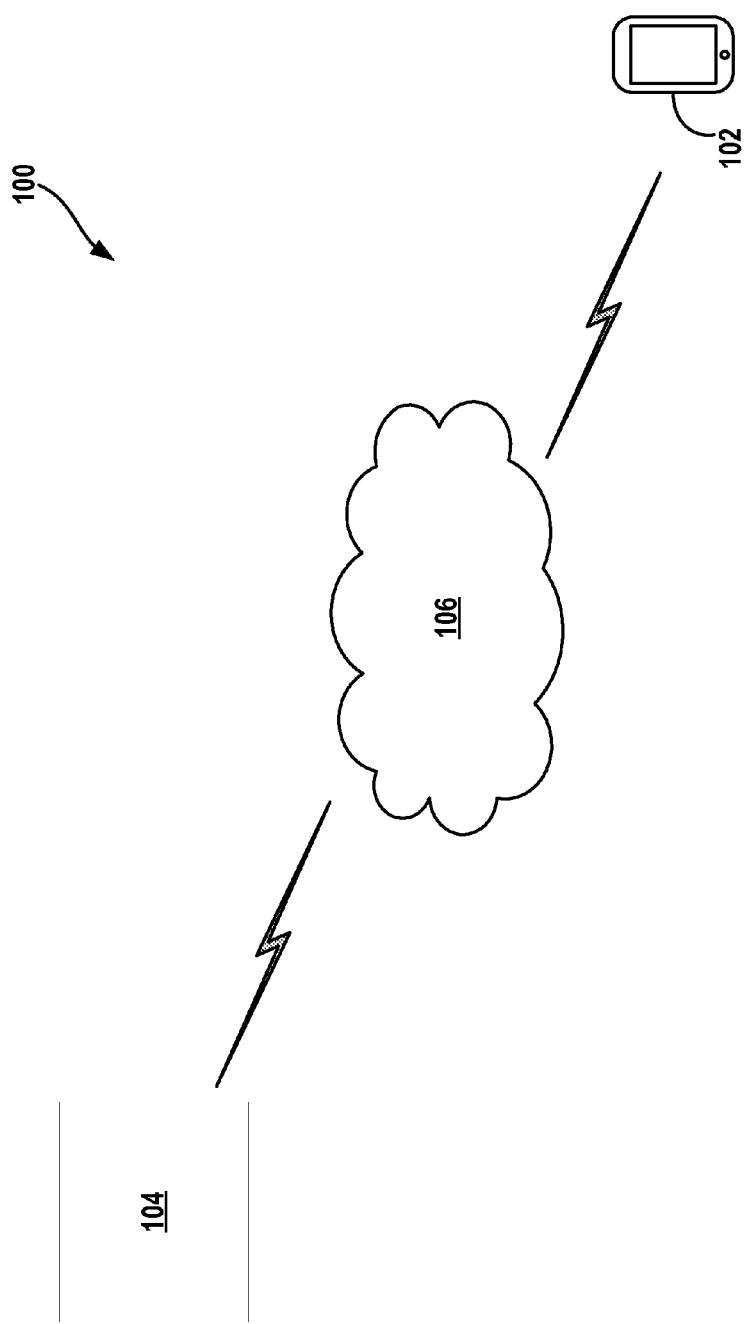
FIG. 1 is a schematic diagram of an example system, in accordance with some implementations.

FIG. 1 is a schematic diagram of an example system 100, in accordance with some implementations. As shown, system 100 includes a computing device 102 that is wirelessly coupled to a server 104 via a network 106. The network 106 may, for example, be a packet-switched network. Other networks are possible as well.

As shown, the computing device 102 is a smartphone, though other types of computing devices 102 could alternatively or additionally be used. For example, the computing device 102 may be a tablet computer, a laptop computer, a desktop computer, a head-mounted or otherwise wearable computer, or any other device configured to wirelessly couple to server 104.

The computing device 102 may be configured to record an image of a view from the computing device 102. Further, the computing device 102 may be configured to send to the server 104 a query for an estimated global pose of the computing device 102. The query may be based on the image.

The server 104 may be configured to receive the query and, in response to receiving the query, determine an estimated global pose of the computing device 102. In some implementations, the query may include the image and the server 104 may be configured to determine an estimated global pose of the computing device 102 based on the image by, for example, comparing the image with a database of reference images having known locations and orientations. The server 104 may determine the estimated global pose in other ways as well.

The server may be further configured to send the estimated global pose of the computing device 102 to the computing device 102. The estimated global pose may include, for example, an estimated location of the computing device 102 and an estimated orientation of the computing device 102.

The computing device 102 may be further configured to receive the estimated global pose. The computing device 102 may be still further configured to determine an updated estimated global pose. To this end, the computing device 102 may be configured to record an updated image of an updated view from the device and to use at least one sensor on the device to determine at least one sensor reading corresponding to movement of the device. The computing device 102 may be further configured to determine a relative pose of the computing device 102 based on the updated image and the at least one sensor reading. The relative pose may be relative to, for example, the estimated global pose received from the server 104. Further, the computing device 102 may be configured to determine the updated estimated global pose based on the relative pose and the estimated global pose.

An example computing device is further described below in connection with FIG. 2, while an example server is further described below in connection with FIG. 3.

a. Example Computing Device

Figure 2:
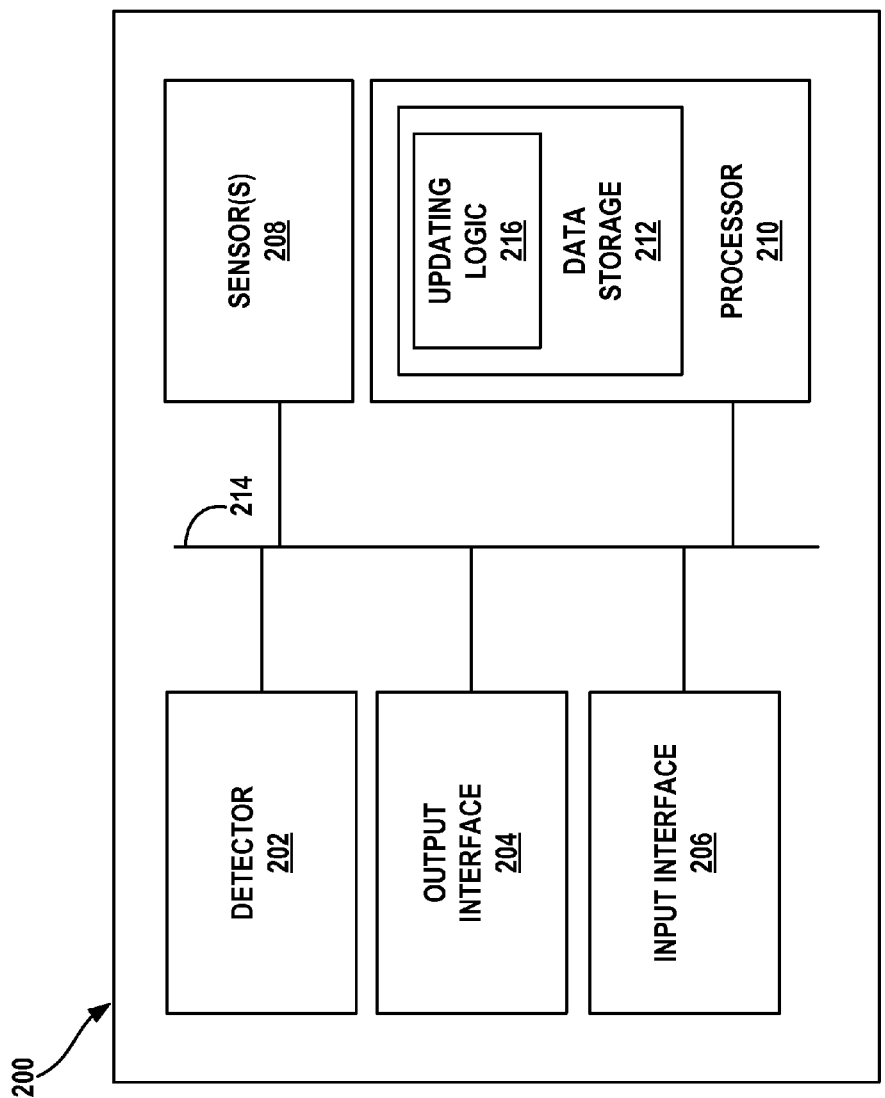
FIG. 2 shows a block diagram of an example device, in accordance with some implementations.

FIG. 2 shows a block diagram of an example computing device 200, in accordance with some implementations. As shown, the computing device 200 includes a detector 202, an output interface 204, and input interface 206, at least one sensor 208, a processor 210, and data storage 212, all of which may be communicatively linked together by a system bus, network, and/or other connection mechanism 214.

The detector 202 may be any detector configured to record an image of a view from the computing device. Further, the detector 202 may be configured to record an updated image of an updated view from the device. To this end, the detector 202 may be, for example, a camera or other imaging device. The detector 202 may be a two-dimensional detector, or may have a three-dimensional spatial range. In some implementations, the detector 202 may be enhanced through sensor fusion technology. The detector 202 may take other forms as well.

The output interface 204 may be any interface configured to send to the server a query based on the image recorded by the detector 202. For example, the output interface 204 could be a wireless interface. The output interface 204 may include an antenna and a chipset for communicating with the server over an air interface. The chipset or output interface 204 in general may be arranged to communicate according to one or more types of wireless communication, e.g. protocols, such as Bluetooth, communication protocols described in IEEE 802.11, including any IEEE 802.11 revisions, cellular technology, such as GSM, CDMA, UMTS, EV-DO, WiMAX, or LTE, or Zigbee, among other possibilities. The output interface 204 may take other forms as well. In some implementations, the output interface 204 may also be configured to wirelessly communicate with one or more entities besides the server.

The input interface 206 may be any interface configured to receive from the server an estimated global pose of the computing device 200. The estimated global pose may include, for example, and estimated location of the computing device 200 and an estimated orientation of the computing device 200. To this end, the input interface 206 may be, for example, a wireless interface, such as any of the wireless interfaces described above. The input interface 206 may take other forms as well. In some implementations, the input interface 206 may also be configured to wirelessly communicate with one or more entities besides the server. Further, in some implementations, the input interface 206 may be integrated in whole or in part with the output interface 204.

The at least one sensor 208 may be or may include any sensor configured to determine at least one sensor reading corresponding to movement of the device. For example, the at least one sensor 208 may include an accelerometer, a gyroscope, compass, stereo cameras, depth sensors, and/or a global positioning system (GPS) receiver. The at least one sensor 208 may include other sensors as well.

The processor 210 may include one or more general-purpose processors and/or one or more special-purpose processors. To the extent the processor 210 includes more than one processor, such processors may work separately or in combination. Further, the processor 210 may be integrated in whole or in part with the detector 202, the output interface 204, the input interface 206, and/or with other components.

Data storage 212, in turn, may include one or more volatile and/or one or more non-volatile storage components, such as optical, magnetic, and/or organic storage, and data storage 212 may be integrated in whole or in part with the processor 210. As shown, data storage 212 contains updating logic executable by the processor 210 to carry out various computing device functions, such as, for example, the computing device functions described below in connection with FIGS. 4 and 5.

The computing device 200 may further include one or more components in addition to or instead of those shown. For example, the computing device 200 may include one or more components for receiving input from a user of the computing device 200, as well as one or more components for providing output to a user of the computing device 200, such as, for example, buttons, a touchscreen, a microphone, and/or any other elements for receiving inputs, as well as a speaker, one or more displays, and/or any other elements for communicating outputs. Further, the computing device 200 may include analog/digital conversion circuitry to facilitate conversion between analog user input/output and digital signals on which the computing device 200 can operate.

As another example, the computing device 200 may include one or more additional sensors and/or devices configured to sense one or more types of information. Example sensors include video cameras, still cameras, infrared sensors, optical sensors, biosensors, Radio Frequency identification (RFID) systems, wireless sensors, pressure sensors, temperature sensors, and/or magnetometers, among others. Depending on the additional sensors, data storage 212 may further include program logic executable by the processor 210 to control and/or communicate with the sensors, and/or send to the server data representing information sensed by one or more sensors.

b. Example Server

Figure 3:
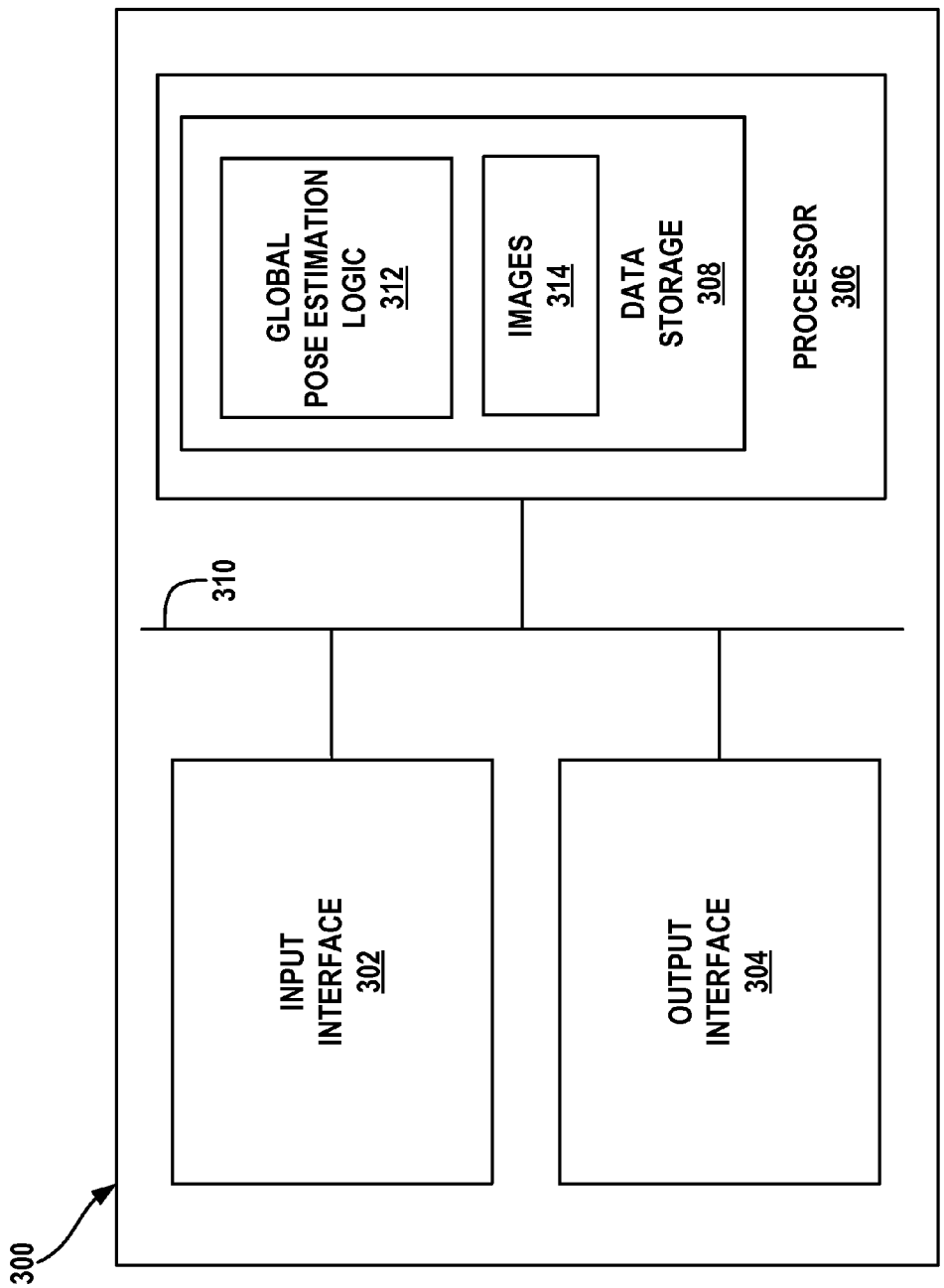
FIG. 3 shows a block diagram of an example server, in accordance with some implementations.

FIG. 3 shows a block diagram of an example server 300, in accordance with some implementations. As shown, the server 300 includes an input interface 302, an output interface 304, a processor 306, and data storage 308, all of which may be communicatively linked together by a system bus, network, and/or other connection mechanism 310.

The input interface 302 may be any interface configured to receive a query sent by a computing device, such as the computing device 200 described above. To this end, the input interface 302 may be a wireless interface, such as any of the wireless interfaces described above. Alternately or additionally, the input interface 302 may be a web-based interface accessible by a user of the computing device. The input interface 302 may take other forms as well. In some implementations, the input interface 302 may also be configured to wirelessly communicate with one or more entities besides the computing device.

The output interface 304 may be any interface configured to send an estimated global pose of the computing device to the computing device. To this end, the output interface 304 may be a wireless interface, such as any of the wireless interfaces described above. Alternately or additionally, the output interface 304 may be a web-based interface accessible by a user of the computing device. The output interface 304 may take other forms as well. In some implementations, the output interface 304 may also be configured to wirelessly communicate with one or more entities besides the computing device. In some implementations, the output interface 304 may be integrated in whole or in part with the input interface 302.

The processor 306 may include one or more general-purpose processors and/or one or more special-purpose processors. To the extent the processor 306 includes more than one processor, such processors could work separately or in combination. Further, the processor 306 may be integrated in whole or in part with the input interface 302, the output interface 304, and/or with other components.

Data storage 308, in turn, may include one or more volatile and/or one or more non-volatile storage components, such as optical, magnetic, and/or organic storage, and data storage 308 may be integrated in whole or in part with the processor 306. Data storage 308 may include global pose estimation logic executable by the processor 306 to determine the estimated global pose of the computing device.

In some implementations, determining the estimated global pose may involve, for example, comparing an image recorded at the computing device, and/or information associated with the image such as, for example, one or more visual features, e.g., colors, shapes, textures, brightness levels, shapes, of the image, with a database of images 314. The database of images 314 may be stored in the data storage 308, as shown, or may be otherwise accessible by the server 300. Each image in the database of images 314 may be associated with information regarding a location and/or orientation from which the image was recorded. Thus, in order to determine the estimated global pose of the computing device, the server 300 may compare the image recorded at the computing device with some or all of the images in the database of images 314, or with features, e.g., points corresponding to a three-dimensional representation, derived from some or all of the images in the database of images 314. Based on the comparison, the server 300 may select one or more images from the database that are similar to, e.g., share a threshold number and/or configuration of visual features with, the image recorded at the computing device, and may determine an estimated location and/or estimated orientation of the computing device to be the same as, similar to, or derived from a known location and/or orientation of the selected one or more images. Based on the estimated location and/or the estimated orientation of the computing device, the server 300 may determine an estimated global pose. The estimated global pose may be, for example, a concatenation of the estimated location and the estimated orientation. The estimated global pose may take other forms as well. In some implementations, the server 300 may additionally receive from the computing device an estimated location of the computing device as determined by, for example, a location sensor, such as a GPS receiver, at the computing device. In these implementations, the server 300 may additionally use the estimated location in determining the estimated global pose. Further, in some implementations, the server 300 may additionally receive from the computing device one or more sensors readings taken by one or more sensors at the computing device, such as an accelerometer, a gyroscope, and/or a compass. In these implementations, the server 300 may additionally use the one or more sensor readings in determining the estimated global pose. The server 300 may determine the estimated global pose in other manners as well.

The server 300 may further include one or more elements in addition to or instead of those shown.

2. Example Method

Figure 4:
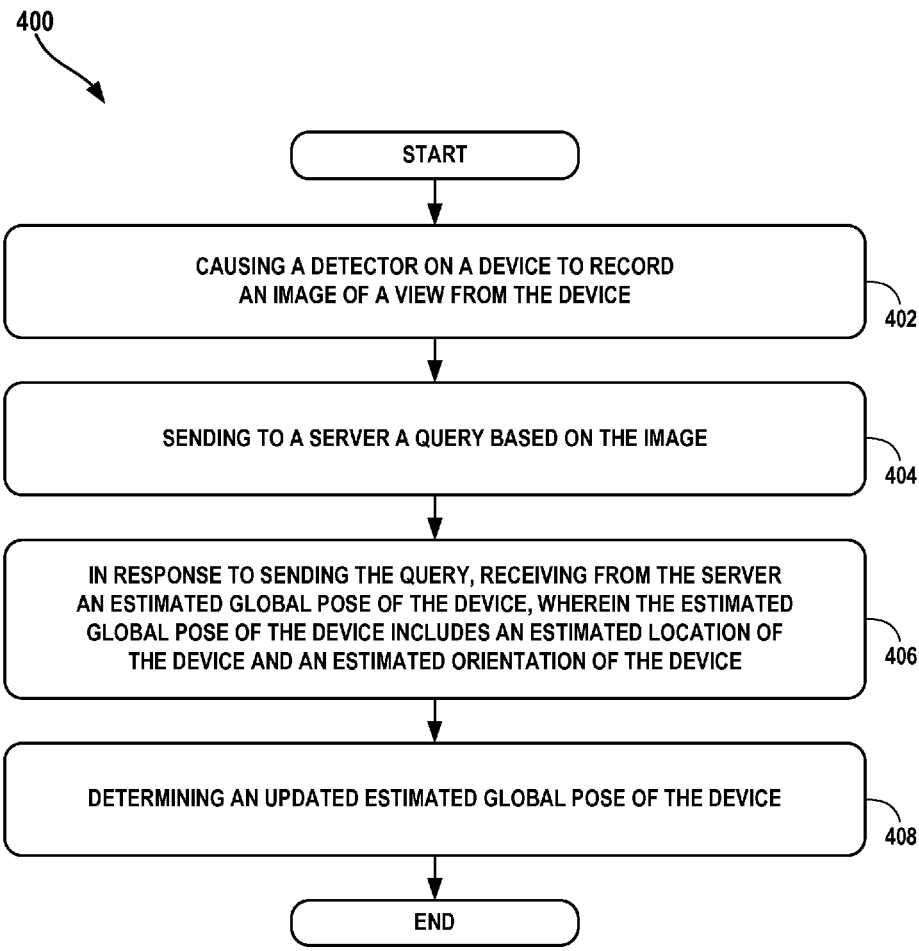
FIG. 4 shows a flow chart according to some implementations of an example method for determining an estimated global pose of a device.

FIG. 4 shows a flow chart according to some implementations of an example method for determining an estimated global pose of a device.

Method 400 shown in FIG. 4 presents an example method that, for example, could be used with the systems, computing devices, and servers described herein. Method 400 may include one or more operations, functions, or actions as illustrated by one or more of blocks 402-408. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

In addition, for the method 400 and other processes and methods disclosed herein, the flowchart shows functionality and operation of some possible implementations. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include a non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, and compact-disc read only memory (CD-ROM), for example. The computer readable medium may also be any other volatile or non-volatile storage systems. The computer readable medium may be considered a computer readable storage medium, a tangible storage device, or other article of manufacture, for example.

In addition, for the method 400 and other processes and methods disclosed herein, each block may represent circuitry that is wired to perform the specific logical functions in the process.

As shown, the method 400 begins at block 402 where a device, such as a computing device, causes a detector to record an image of a view from the device. In some implementations, the device may use the detector to record the image in response to a trigger, such as a trigger received from a user via, for example, a user interface on the computing device. Alternately or additionally, the device may use the detector to record a series of images periodically or continuously, and the image may be an image in a series of recorded images. The image may be selected from the series of recorded images automatically or manually, and may be selected based on, for example, a number or configuration of visual features in the image, a quality of the image, or other criteria. The device may use the detector to record the image in other manners as well.

The method 400 continues at block 404 where the device sends to a server a query based on the image. In some implementations, the query may include the image in, for example, a compressed format. In other implementations, prior to sending the query, the device may analyze the image to identify information associated with the image such as, for example, one or more visual features, e.g., colors, shapes, textures, brightness levels, shapes, of the image. In these implementations, the query may alternately or additionally include an indication of the information associated with the image. In still other implementations, the query may additionally include an estimated location of the device as determined by, for example, a location sensor, such as a GPS receiver, at the device. The query may take other forms as well.

In some implementations, the device may additionally cause one or more sensors at the device, such as an accelerometer, a gyroscope, and/or a compass, to take one or more sensor readings. In these implementations, the device may additionally send to the server the one or more sensor readings.

The method 400 continues at block 406 where, in response to sending the query and, in some cases, the one or more sensor readings, the device receives from the server an estimated global pose of the device. The estimated global pose may include an estimated location of the device and an estimated orientation of the device. The estimated location may be, for example, a three-dimensional location. Similarly, the estimated orientation may be, for example, a three-dimensional orientation. One or both of the estimated location and the estimated orientation may take the form of coordinates or a matrix. Other estimated locations and orientations are possible as well.

In some implementations, in addition to receiving the estimated global pose, the device may receive additional information from the server. For example, the device may receive depth information indicating a depth, e.g., a distance from the detector, of at least one object in the image. Alternately or additionally, the device may receive a location and/or orientation of an object in the image. The device may receive other information from the server as well.

At block 408, the device determines an updated estimated global pose of the device. The device may determine the updated estimated global pose using the estimated global pose received from the server in combination with, for example, one or more sensor readings taken by one or more sensors on the device. Alternately or additionally, the device may determine the updated estimated global pose using an updated image of an updated view from the device. Still alternately or additionally, in implementations where the device additionally received one or both of depth information and a location and/or orientation of an object in the image sent to the server, the depth information, location, and/or orientation may additionally be used by the device in determining an updated estimated global pose of the computing device.

A number of example methods for determining an updated estimated global pose of a device are shown in FIGS. 5A-D. Methods 500, 510, 520, and 532 shown in FIGS. 5A-D present implementations of example methods that, for example, could be used with the systems, computing devices, and servers described herein. Methods 500, 510, 520, and 532 may include one or more operations, functions, or actions as illustrated by one or more of blocks 502-508, 512-518, 522-530, and 534-538, respectively. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

Figure 5A:
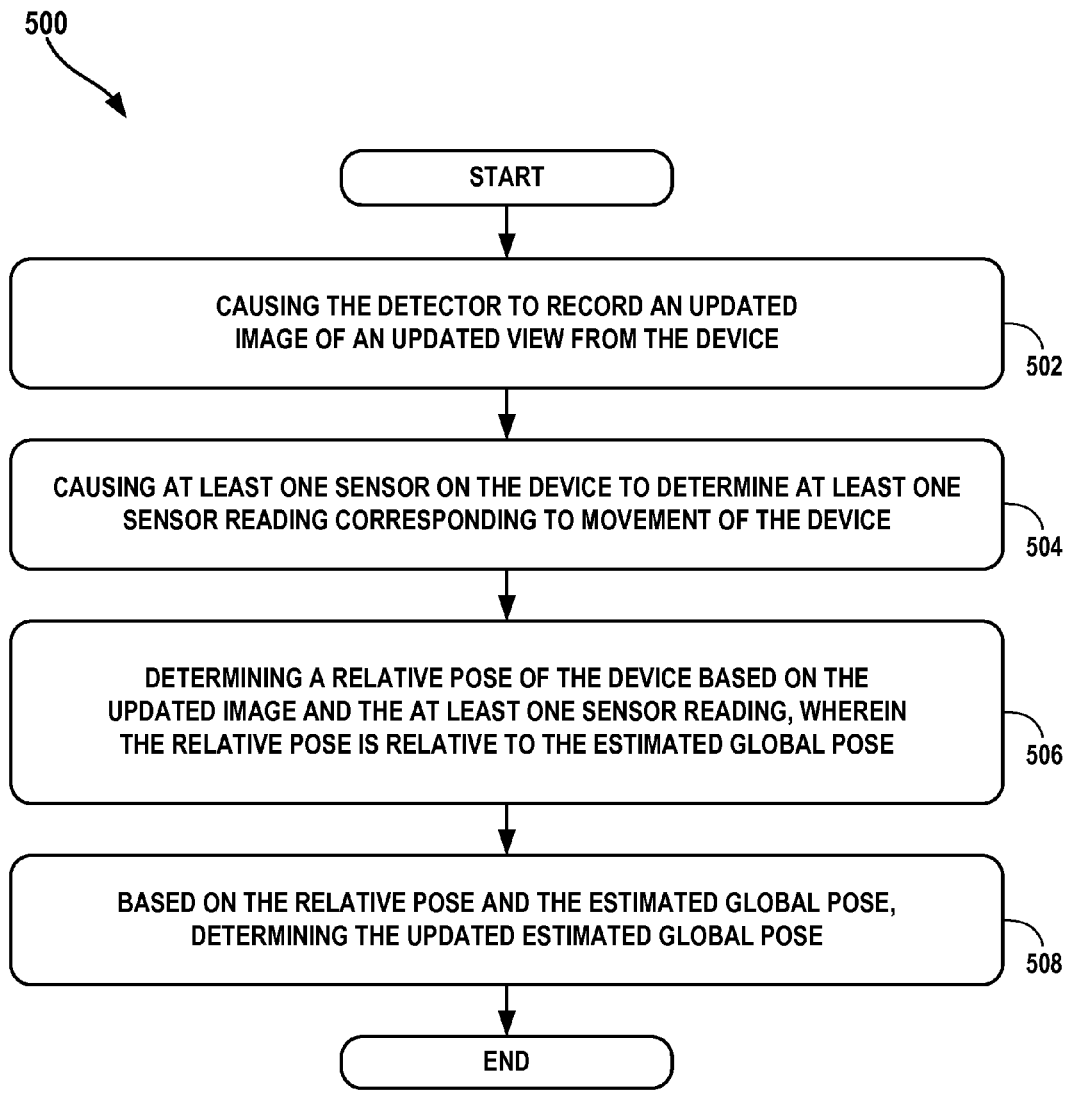
FIGS. 5A-D show flow charts according to some implementations of example methods for determining an updated estimated global pose of a device.

FIG. 5A illustrates a method 500 in which an updated image and at least one sensor reading are used to determine the updated estimated global pose. As shown, the method 500 begins at block 502 where the device causes the detector to record an updated image of an updated view from the device. In some implementations, the device may cause the detector to record the updated image in response to a trigger, such as a trigger received from a user via, for example, a user interface on the computing device. Alternately or additionally, the device may cause the detector to record a series of images periodically or continuously, and the updated image may be an image in a series of recorded images. The updated image may, for example, be selected from the series of recorded images automatically or manually. The device may cause the detector to record the updated image in other manners as well.

The method 500 continues at block 504 where the device causes at least one sensor on the device to determine at least one sensor reading corresponding to movement of the device. In some implementations, the at least one sensor may include, for example, an accelerometer and/or a gyroscope. In general, the at least one sensor may include at least one translational sensor. Other sensors are possible as well. The at least one sensor reading may be in a predetermined unit, such as centimeters or degrees. Other units are possible as well.

At block 506, the device determines a relative pose of the device based on the updated image and the at least one sensor reading. The relative pose may be relative to the estimated global pose. For example, the device may receive from the server an estimated global pose of:

(x, y, z, α, β, γ), where the estimated three-dimensional location of the device is given by (x,y,z) and the estimated three-dimensional orientation of the device is given by (α, β, γ).

Further, the device may compare the updated image with the image, and/or may use the at least one sensor reading, to determine that the location of the device has shifted by a location-shift given by, for example, (Δx, Δy, Δz) centimeters. And the device may compare the updated image with the image, and/or may use the at least one sensor reading to determine that the orientation of the device has shifted by an orientation-shift given by, for example, (Δα, Δβ, Δγ) degrees. Each of Δx, Δy, Δz, Δα, Δβ, Δγ could take any positive, negative, or zero value. Based on the indicated shifts in location and orientation, the device may determine a location-and-orientation-shift given by, for example, (Δx, Δy, Δz, Δα, Δβ, Δγ).

Using the estimated global pose and the determined location-and-orientation shift, the device may determine the relative pose. For instance, the device may convert each of the estimated global pose and the location-and-orientation shift into matrix form and may multiply the estimated global pose matrix with the location-and-orientation shift matrix, and the relative pose may be a function of the multiplied matrices. The device may determine the relative pose in other manners as well.

The method 500 continues at block 508 where the device determines, based on the relative pose and the estimated global pose, the updated estimated global pose of the device. For instance, in the example above, the device may determine the updated estimated global pose to be given by, for example, a function of the multiplied estimated global pose and location-and-orientation shift matrices.

Figure 5B:
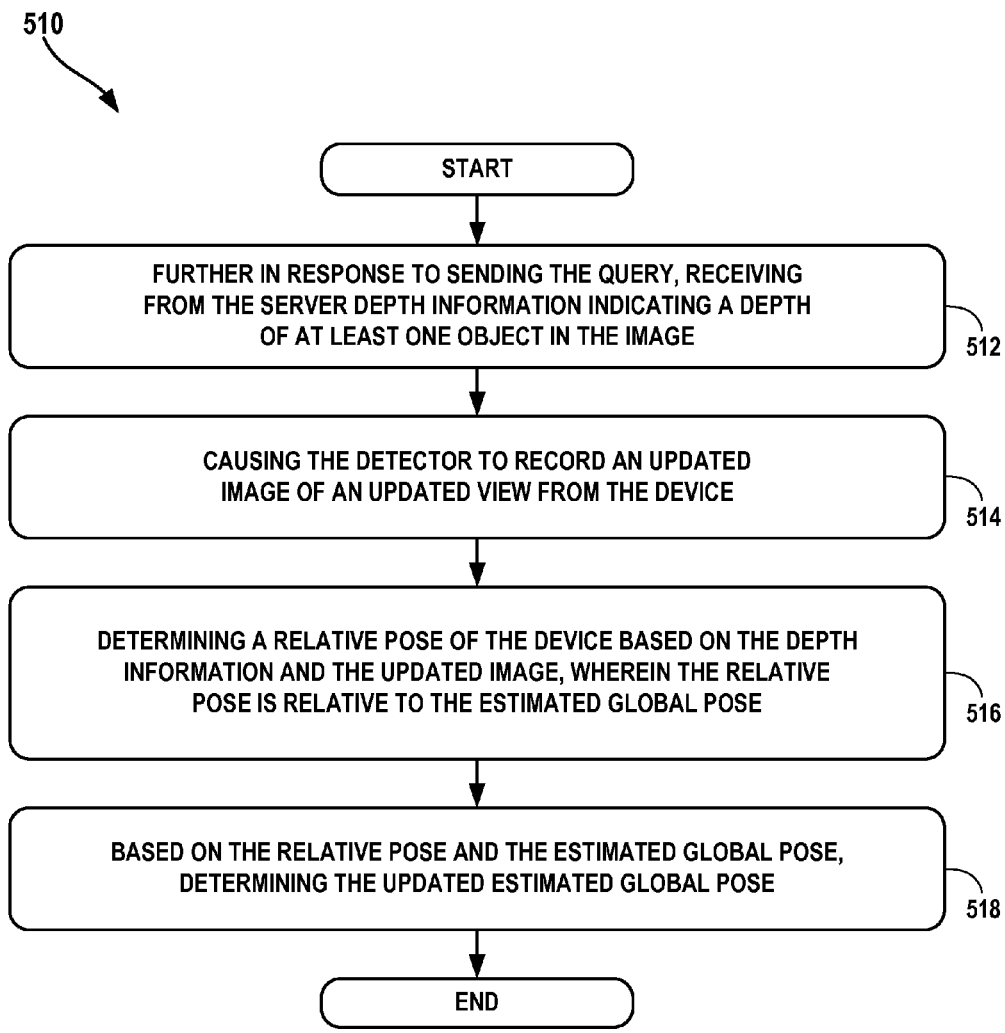

FIG. 5B illustrates a method 510 in which depth information and an updated image are used to determine the updated estimated global pose. As shown, the method 510 begins at block 512 where, further in response to sending the query to the server, the device receives from the server depth information indicating a depth of at least one object in the image. The depth may be, for example, an actual distance between the object and the device. The at least one object may be, for example, points, lines, and/or planes in the image. Other objects are possible as well.

The method 510 continues at block 514 where the device causes the detector to record an updated image of an updated view from the device. The device may record the updated image in any of the manners described above.

The method 510 continues at block 516 where the device determines a relative pose of the device based on the depth information and the updated image. The relative pose may be relative to the estimated global pose, as described above. In order to determine the relative pose, the device may use the depth information to determine an actual scale of the image. By knowing the actual scale of objects in the image, the device may determine the relative pose using, for example, a vector displacement process. In such a vector displacement process, the device may determine a relative distance between the location of a reference point in the image sent to the server and the location of the reference point in the updated image. The device may then use the actual scale to convert the relative distance to an actual distance. The actual distance between the location of the reference point in the image sent to the server and the location of the reference point in the updated image may correspond to movement of the device in a manner similar to the at least one sensor reading described above and, accordingly, may similarly be used to determine the relative pose of the device.

As noted above, in some implementations, in addition to or instead of receiving the depth information, the server may receive from the server the location and/or orientation of an object in the image sent to the server. In these implementations, the relative pose determined by the device may be based on the location and/or orientation of the object received from the server. In particular, the device may determine an actual distance between the object and the device and may use the determined distance to determine an actual scale of the image. The device may then use the actual scale of the image to determine the relative pose, as described above. In implementations where depth information is also received, the device may use the actual scale of the image to verify the relative pose.

The method 510 continues at block 508 where the device determines, based on the relative pose and the estimated global pose, the updated estimated global pose of the device, as described above.

Figure 5C:
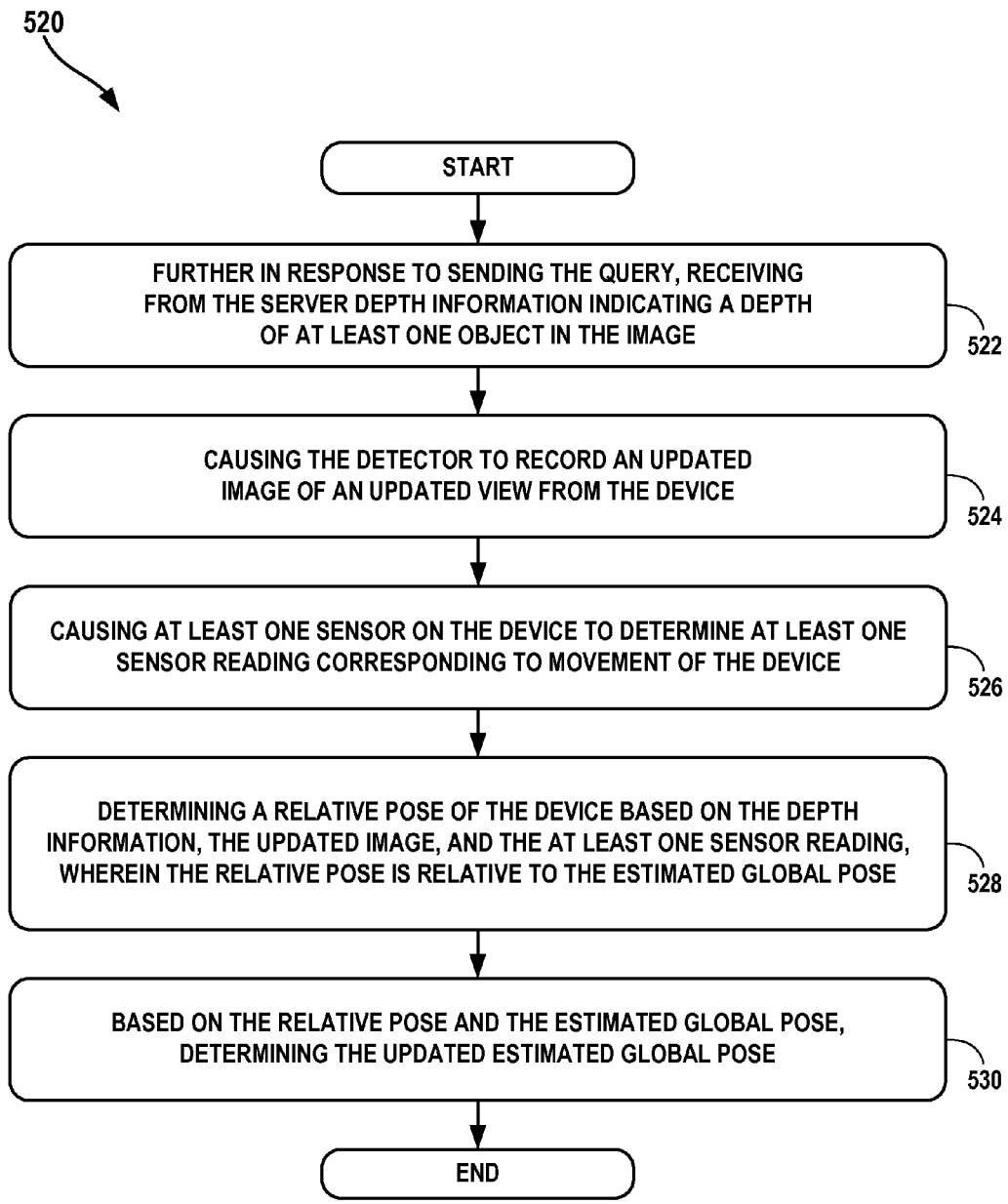

FIG. 5C illustrates a method 520 in which depth information, an updated image, and at least one sensor reading are used to determine the updated estimated global pose. As shown, the method 520 begins at block 522 where, further in response to sending the query to the server, the device receives from the server depth information indicating a depth of at least one object in the image, as described above.

The method 520 continues at block 524 where the device causes the detector to record an updated image of an updated view from the device. The device may record the updated image in any of the manners described above.

At block 526, the device causes at least one sensor to determine at least one sensor reading corresponding to movement of the device. The device may determine the at least one sensor reading in any of the manners described above.

The method 520 continues at block 528 where the device determines a relative pose of the device based on the depth information, the updated image, and the at least one sensor reading. The relative pose may be relative to the estimated global pose. The device may determine the relative pose using the depth information and the updated image, as described above, and may further verify the relative pose using the updated image and the at least one sensor reading, as described above. Alternately, the device may determine the relative pose using the updated image and the at least one sensor reading, as described above, and may further verify the relative pose using the depth information and the updated image, as described above. The device may determine the relative pose in other manners as well.

The method 520 continues at block 530 where the device determines, based on the relative pose and the estimated global pose, the updated estimated global pose of the device, as described above.

Figure 5D:
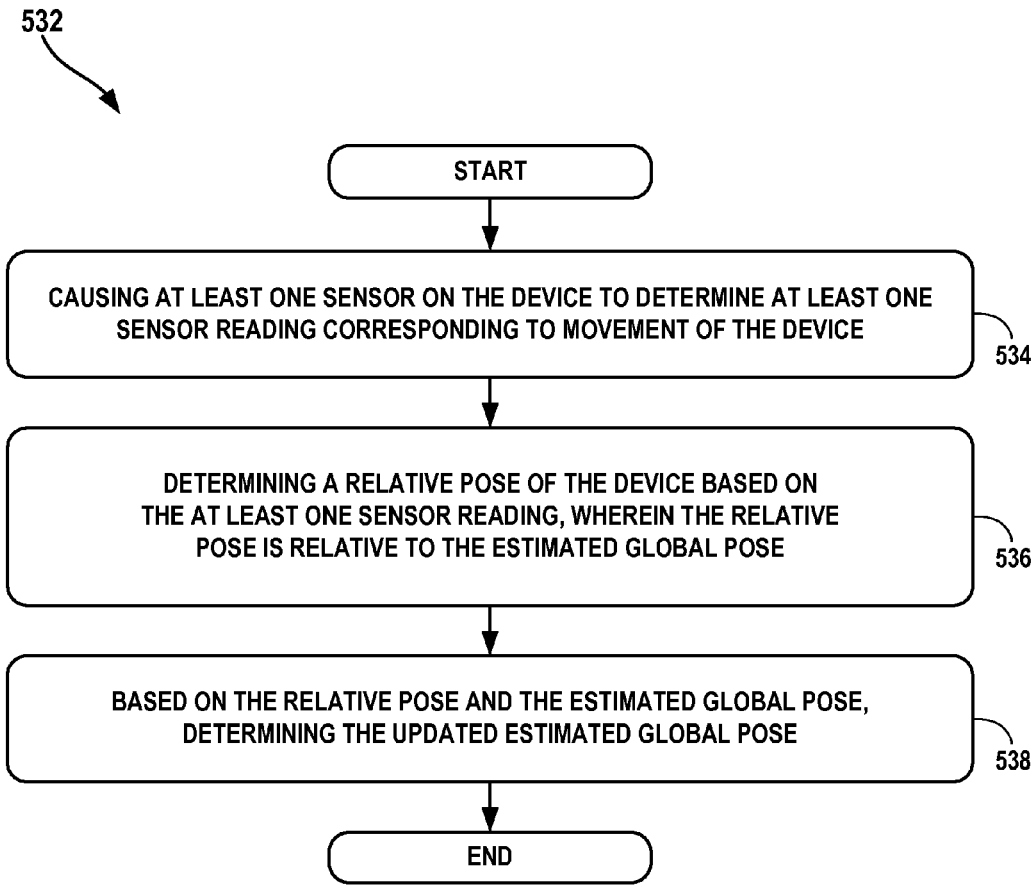

FIG. 5D illustrates a method 532 in which at least one sensor reading is used to determine the updated estimated global pose. As shown, the method 532 begins at block 534 where the device causes at least one sensor on the device to determine at least one sensor reading corresponding to the movement of the device. The device may determine the at least one sensor reading in any of the manners described above.

At block 536, the device determines a relative pose of the device based on the at least one sensor reading by, for example, determining a location-shift and an orientation-shift of the device, as described above. The relative pose may be relative to the estimated global pose.

The method 532 continues at block 538 where, based on the relative pose and the estimated global pose, the device determines the updated estimated global pose, as described above.

Any of the methods 500, 510, 520, and 532 may be modified and/or combined to produce additional methods. Further, any of the methods 500, 510, 520, and 532 may be carried out periodically and/or in response to a trigger. For example, in some implementations, any of the methods 500, 510, 520, and 532 may be carried out periodically for a time period following receipt of the estimated global pose. The time period may have a duration that is predetermined based on, for example, a determined error in one or more sensors in the device, and/or an accumulated error in the estimated global pose that results from the determined error in the one or more sensors in the device. For instance, for a larger determined error in one or more sensors in the device and/or a larger accumulated error in the estimated global pose resulting from the larger determined error in the one or more sensors in the device, it may be beneficial for the time period to have a shorter duration, such that the device receives an estimated global pose from the server with greater frequency in an effort to counter or lessen the accumulated error in the estimated global pose. Alternately or additionally, the duration may be predetermined based on a magnitude of the movement sensed by the one or more sensors in the device. For instance, for a larger magnitude of movement, it may be beneficial for the time period to have a shorter duration, such that the device receives an estimated global pose from the server with greater frequency in an effort to better process the larger-magnitude movement of the device. In still other implementations, the duration may be predetermined based on user preference. For instance, a user may wish to receive the estimated global pose from the server with a lesser frequency in an effort to, for example, preserve battery life of the device. The duration of the time period may be based on other factors as well.

Further, a frequency with which any of the methods 500, 510, 520, and 532 is carried out may be based on, for example, a determined error in one or more sensors in the device. For instance, for a larger determined error in the one or more sensors in the device, it may be beneficial to determine an updated estimated global pose of the device with greater frequency in an effort to counter the error in the sensors. Alternately or additionally, the frequency may be based on a magnitude of movement sensed by one or more sensors in the device. For instance, for a larger magnitude of movement, it may be beneficial to determine an updated estimated global pose of the device with greater frequency in an effort to better process the larger-magnitude movement of the device. Still alternately or additionally, the frequency may be based on user preference. For instance, a user may wish to determine the updated estimated global pose of the device with a lesser frequency in an effort to, for example, preserve battery life of the device. The frequency may be based on other factors as well.

As another example, any of the methods 500, 510, 520, and 532 may be carried out in response to detection of a trigger, such as movement, e.g., as sensed by one or more sensors in the device, having a magnitude greater than a threshold magnitude or a trigger received from a user via, for example, a user interface on the device. The methods 500, 510, 520, and 532 may be carried out in other manners as well.

While various aspects and implementations have been disclosed herein, other aspects and implementations will be apparent to those skilled in the art. The various aspects and implementations disclosed herein are for purposes of illustration and are not intended to be limiting, with the true scope and spirit being indicated by the following claims.

What is claimed is:

1. A computer-implemented method comprising:
   obtaining, by a computing device, first sensor data including a first image taken by the computing device;
   obtaining a first estimated location of the computing device and a first estimated orientation of the computing device, wherein the first estimated location and the first estimated orientation are generated by a first estimator based at least on one or more visual features of the first image;
   obtaining, by the computing device, second sensor data including a second image taken by the computing device;
   determining, based on a comparison between the first image and the second image, (i) a change from the first estimated location of the computing device and (ii) a change from the first estimated orientation of the computing device;
   obtaining a second estimated location of the computing device generated by a second estimator based at least on the change from the first estimated location;
   obtaining a second estimated orientation of the computing device generated by the second estimator based at least on the change from the first estimated orientation; and
   obtaining (i) an updated estimated location of the computing device based at least on the first estimated location and the second estimated location, and (ii) an updated estimated orientation of the computing device based at least on the first estimated orientation and the second estimated orientation.

2. The method of claim 1, wherein obtaining first sensor data including a first image comprises:
   obtaining multiple images including the first image; and
   selecting the first image based on one or more particular visual features in the first image.

3. The method of claim 1, wherein obtaining the first estimated location of the computing device and the first estimated orientation of the computing device comprises:
   transmitting a query including at least a portion of the first sensor data, from the computing device to a server; and
   receiving, in response to the query, the first estimated location and the first estimated orientation generated by the first estimator at the server.

4. The method of claim 1,
   wherein obtaining the first estimated location of the computing device and the first estimated orientation of the computing device comprises converting the first estimated location of the computing device and the first estimated orientation of the computing device into a first matrix,
   wherein obtaining the second estimated location of the computing device and the second estimated orientation of the computing device comprises converting the change from the first estimated location of the computing device and the change from the first estimated orientation of the computing device into a second matrix,
   and wherein obtaining (i) the updated estimated location of the computing device and (ii) the updated estimated orientation of the computing device comprises multiplying the first matrix by the second matrix to obtain a third matrix representing the updated estimated location of the computing device and the updated estimated orientation of the computing device.

5. The method of claim 1, wherein the first sensor data include data received form at least one of an accelerometer, a gyroscope, a compass, a camera, a depth sensor, or a global positioning system (GPS) receiver.

6. A non-transitory computer-readable medium storing software having stored thereon instructions, which, when executed by one or more computers, cause the one or more computers to perform operations of:
   obtaining, by a computing device, first sensor data including a first image taken by the computing device;
   obtaining a first estimated location of the computing device and a first estimated orientation of the computing device, wherein the first estimated location and the first estimated orientation are generated by a first estimator based at least on one or more visual features of the first image;

obtaining, by the computing device, second sensor data including a second image taken by the computing device;

determining, based on a comparison between the first image and the second image, (i) a change from the first estimated location of the computing device and (ii) a change from the first estimated orientation of the computing device;

obtaining a second estimated location of the computing device generated by a second estimator based at least on the change from the first estimated location;

obtaining a second estimated orientation of the computing device generated by the second estimator based at least on the change from the first estimated orientation; and obtaining (i) an updated estimated location of the computing device based at least on the first estimated location and the second estimated location, and (ii) an updated estimated orientation of the computing device based at least on the first estimated orientation and the second estimated orientation.

7. The computer-readable medium of claim 6, wherein obtaining first sensor data including a first image comprises:
obtaining multiple images including the first image; and
selecting the first image based on one or more particular visual features in the first image.

8. The computer-readable medium of claim 6, wherein obtaining the first estimated location of the computing device and the first estimated orientation of the computing device comprises:
transmitting a query including at least a portion of the first sensor data, from the computing device to a server; and
receiving, in response to the query, the first estimated location and the first estimated orientation generated by the first estimator at the server.

9. The computer-readable medium of claim 6,
wherein obtaining the first estimated location of the computing device and the first estimated orientation of the computing device comprises converting the first estimated location of the computing device and the first estimated orientation of the computing device into a first matrix,
wherein obtaining the second estimated location of the computing device and the second estimated orientation of the computing device comprises converting the change from the first estimated location of the computing device and the change from the first estimated orientation of the computing device into a second matrix,
and wherein obtaining (i) the updated estimated location of the computing device and (ii) the updated estimated orientation of the computing device comprises multiplying the first matrix by the second matrix to obtain a third matrix representing the updated estimated location of the computing device and the updated estimated orientation of the computing device.

10. A system comprising:
one or more processors and one or more computer storage media storing instructions that are operable, when executed by the one or more processors, to cause the one or more processors to perform operations comprising:
obtaining, by a computing device, first sensor data including a first image taken by the computing device;
obtaining a first estimated location of the computing device and a first estimated orientation of the computing device, wherein the first estimated location and the first estimated orientation are generated by a first estimator based at least on one or more visual features of the first image;

obtaining, by the computing device, second sensor data including a second image taken by the computing device;

determining, based on a comparison between the first image and the second image, (i) a change from the first estimated location of the computing device and (ii) a change from the first estimated orientation of the computing device;

obtaining a second estimated location of the computing device generated by a second estimator based at least on the change from the first estimated location;

obtaining a second estimated orientation of the computing device generated by the second estimator based at least on the change from the first estimated orientation; and obtaining (i) an updated estimated location of the computing device based at least on the first estimated location and the second estimated location, and (ii) an updated estimated orientation of the computing device based at least on the first estimated orientation and the second estimated orientation.

11. The system of claim 10, wherein obtaining first sensor data including a first image comprises:
obtaining multiple images including the first image; and
selecting the first image based on one or more particular visual features in the first image.

12. The system of claim 10, wherein obtaining the first estimated location of the computing device and the first estimated orientation of the computing device comprises:
transmitting a query including at least a portion of the first sensor data, from the computing device to a server; and
receiving, in response to the query, the first estimated location and the first estimated orientation generated by the first estimator at the server.

13. The system of claim 10,
wherein obtaining the first estimated location of the computing device and the first estimated orientation of the computing device comprises converting the first estimated location of the computing device and the first estimated orientation of the computing device into a first matrix,
wherein obtaining the second estimated location of the computing device and the second estimated orientation of the computing device comprises converting the change from the first estimated location of the computing device and the change from the first estimated orientation of the computing device into a second matrix,
and wherein obtaining (i) the updated estimated location of the computing device and (ii) the updated estimated orientation of the computing device comprises multiplying the first matrix by the second matrix to obtain a third matrix representing the updated estimated location of the computing device and the updated estimated orientation of the computing device.

14. A computer-implemented method comprising:
obtaining, by a computing device, first sensor data including a first image taken by the computing device;
determining a first distance between the computing device and a reference object in the first image;
obtaining a first estimated location of the computing device and a first estimated orientation of the computing device, wherein the first estimated location and the first estimated orientation are generated by a first estimator based at least on the first distance;
obtaining, by the computing device, second sensor data, wherein the second sensor data include a second image taken by the computing device;

determining a second distance between the computing device and the reference object in the second image;

determining a difference between the first distance and the second distance;

obtaining a second estimated location of the computing device and a second estimated orientation of the computing device, wherein the second estimated location and the second estimated orientation are generated by a second estimator based at least on the difference between the first distance and the second distance; and obtaining (i) an updated estimated location of the computing device based at least on the first estimated location and the second estimated location, and (ii) an updated estimated orientation of the computing device based at least on the first estimated orientation and the second estimated orientation.

15. The method of claim 14, wherein obtaining the first estimated location of the computing device and the first estimated orientation of the computing device comprises:

transmitting a query including at least a portion of the first sensor data, from the computing device to a server; and receiving, in response to the query, the first estimated location and the first estimated orientation generated by the first estimator at the server.

16. A non-transitory computer-readable medium storing software having stored thereon instructions, which, when executed by one or more computers, cause the one or more computers to perform operations of:

obtaining, by a computing device, first sensor data including a first image taken by the computing device;

determining a first distance between the computing device and a reference object in the first image;

obtaining a first estimated location of the computing device and a first estimated orientation of the computing device, wherein the first estimated location and the first estimated orientation are generated by a first estimator based at least on the first distance;

obtaining, by the computing device, second sensor data, wherein the second sensor data include a second image taken by the computing device;

determining a second distance between the computing device and the reference object in the second image;

determining a difference between the first distance and the second distance;

obtaining a second estimated location of the computing device and a second estimated orientation of the computing device, wherein the second estimated location and the second estimated orientation are generated by a second estimator based at least on the difference between the first distance and the second distance; and obtaining (i) an updated estimated location of the computing device based at least on the first estimated location and the second estimated location, and (ii) an updated estimated orientation of the computing device based at least on the first estimated orientation and the second estimated orientation.

17. The computer-readable medium of claim 16, wherein obtaining the first estimated location of the computing device and the first estimated orientation of the computing device comprises:

transmitting a query including at least a portion of the first sensor data, from the computing device to a server; and receiving, in response to the query, the first estimated location and the first estimated orientation generated by the first estimator at the server.

18. A system comprising:

one or more processors and one or more computer storage media storing instructions that are operable, when executed by the one or more processors, to cause the one or more processors to perform operations comprising:

obtaining, by a computing device, first sensor data including a first image taken by the computing device;

determining a first distance between the computing device and a reference object in the first image;

obtaining a first estimated location of the computing device and a first estimated orientation of the computing device, wherein the first estimated location and the first estimated orientation are generated by a first estimator based at least on the first distance;

obtaining, by the computing device, second sensor data, wherein the second sensor data include a second image taken by the computing device;

determining a second distance between the computing device and the reference object in the second image;

determining a difference between the first distance and the second distance;

obtaining a second estimated location of the computing device and a second estimated orientation of the computing device, wherein the second estimated location and the second estimated orientation are generated by a second estimator based at least on the difference between the first distance and the second distance; and obtaining (i) an updated estimated location of the computing device based at least on the first estimated location and the second estimated location, and (ii) an updated estimated orientation of the computing device based at least on the first estimated orientation and the second estimated orientation.

19. The system of claim 18, wherein obtaining the first estimated location of the computing device and the first estimated orientation of the computing device comprises:

transmitting a query including at least a portion of the first sensor data, from the computing device to a server; and receiving, in response to the query, the first estimated location and the first estimated orientation generated by the first estimator at the server.

* * * * *